US005968442A

United States Patent
Sato et al.

[11] Patent Number: 5,968,442
[45] Date of Patent: Oct. 19, 1999

[54] METHOD FOR THERMALLY CONNECTING TWO MOLDED PRODUCTS WITH A RESISTANCE HEATING ELEMENT

[75] Inventors: Noboru Sato; Hajime Okamoto; Takashi Suenaga; Michio Haga, all of Fukushima, Japan

[73] Assignee: Tohoku Munekata Co., Ltd., Fukushima-ken, Japan

[21] Appl. No.: 08/880,617

[22] Filed: Jun. 23, 1997

[30] Foreign Application Priority Data

Aug. 8, 1996 [JP] Japan ................................. 8-209647
Oct. 23, 1996 [JP] Japan ................................. 8-280435

[51] Int. Cl.⁶ .................................................. B29C 65/22
[52] U.S. Cl. ........................... 264/449; 264/155; 264/156; 264/248; 156/304.2; 156/304.6
[58] Field of Search .................................. 264/449, 153, 264/155, 248, 156; 425/508; 156/304.2, 304.3, 304.5, 304.6

[56] References Cited

U.S. PATENT DOCUMENTS

| | | | |
|---|---|---|---|
| 3,062,940 | 11/1962 | Bauer et al. | 264/449 |
| 3,394,615 | 7/1968 | Brueder | 264/449 |
| 4,743,320 | 5/1988 | Shaw | 264/449 |
| 5,573,690 | 11/1996 | Nobori et al. | 219/457 |

FOREIGN PATENT DOCUMENTS

| | | |
|---|---|---|
| S58-59050 | 4/1983 | Japan . |
| S62-288029 | 12/1987 | Japan . |

*Primary Examiner*—Jan H. Silbaugh
*Assistant Examiner*—Edmund H. Lee
*Attorney, Agent, or Firm*—McGlew and Tuttle, P.C.

[57] ABSTRACT

A molded product which is molded with thermoplastic resin by a thermal deposition method. The method uses a substantially ring-shaped resistance heating element. A hole is provided for impressing the voltage by inserting the electrode from this hole and impressing the voltage to the resistance heating element. Thereafter the hole is blocked. The electric resistance heating body is disposed between the composition planes of the parts which are to form a body.

8 Claims, 11 Drawing Sheets

METHOD FOR THERMALLY CONNECTING TWO MOLDED PRODUCTS WITH A RESISTANCE HEATING ELEMENT

FIELD OF THE INVENTION

The invention relates to hermetically closing a case main body with a cover after assembling a battery or parts into the case main body, for example, in a plastic molded product, such as a battery case for electronic equipment, various electronic parts cases, etc. The invention relates more particularly to a method for hardening and depositing a molten portion and to the molded product for thermal deposition being used and a resistance heating element by catching a resistance heating element between composition planes of the case main body and cover, impressing a voltage across this heating element, heating the applicable heating element up to the fusion temperature of case main body and cover, fusing the composition planes and then cooling them down.

BACKGROUND OF THE INVENTION

In case of incorporating electronic parts, etc. into a case main body and cover molded with thermoplastic resin and coupling this case main body with the cover, such a method is known which utilizes a supersonic wave, high frequency electromagnetic induction or a bonding agent.

However, with a junction method utilizing such a supersonic wave and a high frequency electromagnetic induction has the danger of inducing an inferior factor to the incorporated electronic parts, etc. Further, in case of coupling by the bonding agent, it takes a long time until the agent gets hardened, and sometimes the bonding agent oozes out of the matched face which becomes the cause for stains and the outside appearance becomes worsened.

As a means for solving this kind of problem, Japan Unexamined Patent Publication (Kokai) No. S58-59050 and Unexamined Patent Publication (Kokai) No. S62-288029 present the method for catching a heating element based on the electric resistance between the fused case main body and the cover, fusing the thermoplastic resin by this heating and mutually depositing the case and cover to each other. This is an effective junction method without having an influence on the internal parts and without having an influence on the outside appearance because it is a fusion method by instantaneous heat.

However, in any of the cases, so long as an electrode or a resistance heating element in a conductor state is used for supplying the voltage to the resistance heating element, this conductor protrudes to the outside of the case and becomes a trouble point with regard to assembling the case into another box body. Further, in the case of a single case body, it becomes sometimes a detriment as to the outside appearance. For this reason, post-processing becomes necessary as cutting the protruded portion of the electrode and conductor as necessary. Moreover, it can be imagined that some kind of liquid invades between the fusion of the resistance heating element and the thermoplastic resin and exerts an influence on the fusion strength.

SUMMARY AND OBJECTS OF THE INVENTION

The first object of this invention is to provide a method for thermally depositing the molded product molded with the thermoplastic resin and for making it possible to impress the voltage without pulling out of the case both the ends of the resistance heating body, which become the terminals for impressing the voltage in this molded product for thermal deposition.

The second object of this invention is to provide a method for thermally depositing the molded product molded with the thermoplastic resin and for allowing the liquid to invade into the gap of the case deposited with the resistance heating element for preventing the deposition strength from getting weakened in this molded product for thermal deposition.

The third object of this invention is the method for thermally depositing the molded product molded with the thermoplastic resin and for providing a resistance heating element that can be completely sealed without any non deposited portion on the deposition plane in this molded product for thermal deposition.

According to the invention, a method for thermally depositing parts of a molded product on each other along composition surfaces is provided. The method comprises positioning a resistance heating element between at least some of the composition surfaces of the molded product parts, the parts being formed of thermoplastic resin. A voltage is applied to the resistance heating body for heating the surfaces. Pressure is applied to the parts with an adequate force to urge the surfaces together, wherein the resistance heating element is heated for depositing the composition surfaces to each other. An opening is provided forming a small diameter hole for inserting a voltage impressing terminal, so that the voltage impressing terminal may reach the resistance heating element, on the applicable molded product section. A voltage impressing terminal is inserted from the outside into the small diameter hole to have it in contact with the resistance heating body.

The hole may be subsequently blocked by heating, pressing and collapsing a stage section using a deposition tip after installing the protrusion stage section in the periphery of the small diameter hole and ending the deposition method of the molded product. A blocking body may also be fitted to the small diameter hole for its blocking.

Another variation of the method includes:

positioning a resistance heating element between at least two surfaces of the molded product parts, the parts being formed of thermoplastic resin;

coupling the surfaces by impressing the voltage to the said resistance heating element for its heating and applying pressure to the parts with an adequate force to urge the surfaces together, fusing the surfaces and thereafter cooling them down for their deposition to each other providing small diameter hole in one of the parts prior to said step of coupling;

inserting a voltage impressing terminal, so that it may reach the resistance heating element, wherein the resistance heating element is heated for depositing the composition surfaces to each other.

Still another variation of the method includes:

providing molded parts of thermoplastic resin;

forming a resistance heating element into a ring shape;

positioning the resistance heating element between at least two surfaces of the molded product parts;

drilling small diameter holes for inserting a voltage impressing terminal at two points at about ½ the length of resistance heating element so that the resistance heating element may reach the applicable molded product section; and inserting the voltage impressing terminal from the outside into the said small hole and applying the voltage to the resistance heating element.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 21.1, 21.2, and 21.3 are an explanatory view of a test piece and test methods used in a comparative example.

DETAILED DESCRIPTION OF THE PREFERRED EMBODIMENTS

Referring to the drawings in particular, the invention comprises a method involving products molded with thermoplastic resin. For example, in a battery case, a groove is to be formed on a deposition face on a side of case main body and moreover a small diameter hole for inserting a voltage impressing terminal is formed so that the voltage may reach the resistance heating element. This groove and the small diameter hole may also be formed on the side of the cover. Also, a protrusion stage section is formed around the small diameter hole. The small diameter hole is generally circular as a rule but may be a square or some other similar opening.

A nickel-chrome alloy, iron-chrome alloy, iron-nickel alloy, etc., for example, can be used for the material of the resistance heating element, and various shapes of a single wire element, a stranded shape of several resistance wires, a plate shape and the like may be selected according to the deposition purpose.

The resistance heating element should preferably be formed to a ring shape in order to deposit and seal the junction metal all around its circumference between the case main body and the cover. As a means for forming this resistance heating element into a ring shape, both the ends of a single wire rod may be connected, and for example, a thin resistance heating plate may be punched with a press for its formation into a ring shape. The ring shape in the resistance heating element means a no-end body, and its shape be one of various shapes such as a circle, a square and so forth so that it may be mated to the shape of composition plane.

As the contents of deposition process, a resistance heating element is positioned into the groove, a cover is placed over it, its lower brim (deposition face) is matched to the deposition face of the case main body side, and further the resistance heating element is caught between both the deposition faces and the case main body and the cover is pressed to each other. When a voltage impressing terminal is inserted into each of the small diameter holes provided at two places in that state and provided in contact with the resistance heating element, and thereafter the voltage is applied for heating the resistance heating element, then the resin around the heating element gets fused.

After this state, if the voltage is stopped and the voltage impressing terminal is taken out of the small diameter hole for naturally or coercively cooling down the fused section, the fused resin gets hardened. As a result, the case main body and the cover get fused, namely deposited to each other and connected with each other.

Next, after the deposition coupling, the expanded section is formed to blockade the small diameter hole by contacting the deposition tip having the contact face of disk shape for its heating and dissolution at one end against the protrusion stage section protruding to the periphery of small diameter hole, heating and fusing the protrusion stage section and further pressing and collapsing the section. As a result, an integrated case can be completed where the resistance heating element can not be seen from the outside of case. Further, the blockage body is fitted to the small diameter hole for blocking this hole.

However, if there is no need for blocking the small diameter hole, the protrusion stage section should not be formed, which should not be collapsed using the deposition tip.

Figure 1:
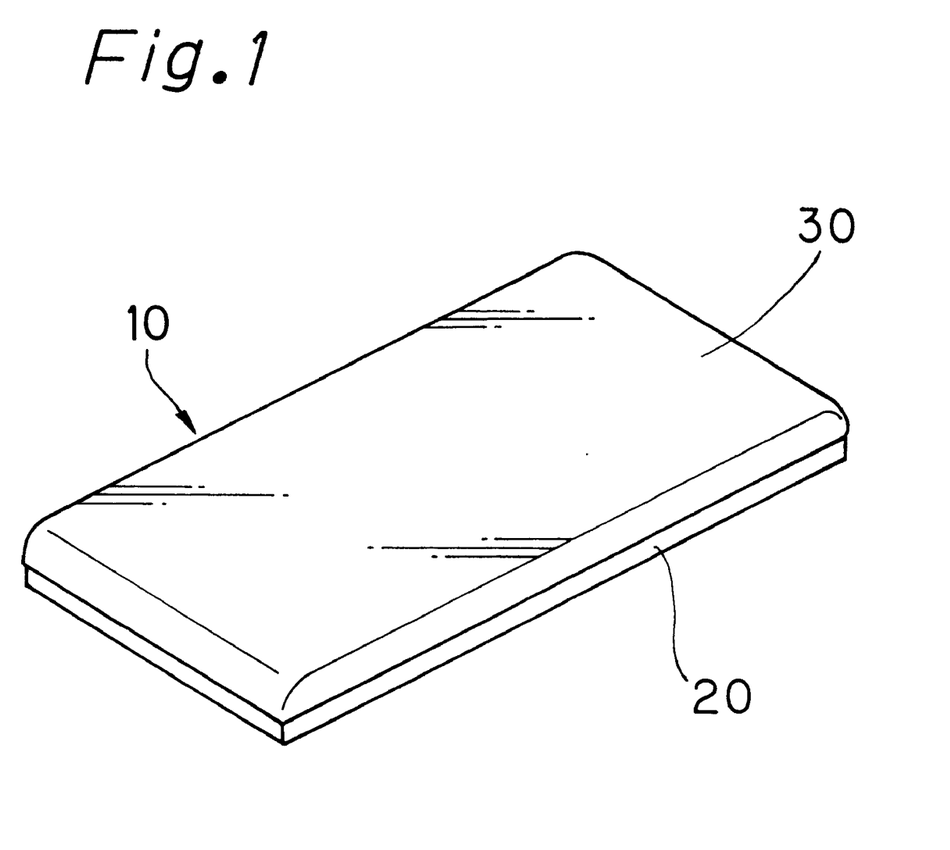
FIG. 1 is a completion oblique view of battery case using the technique of according to a first embodiment of the invention.

FIG. 1 is a completion oblique view of battery case 10 according to a first embodiment of the invention. The battery case 10 is in the shape based on a cover 30 being provided on a case main body 20.

Figure 2:
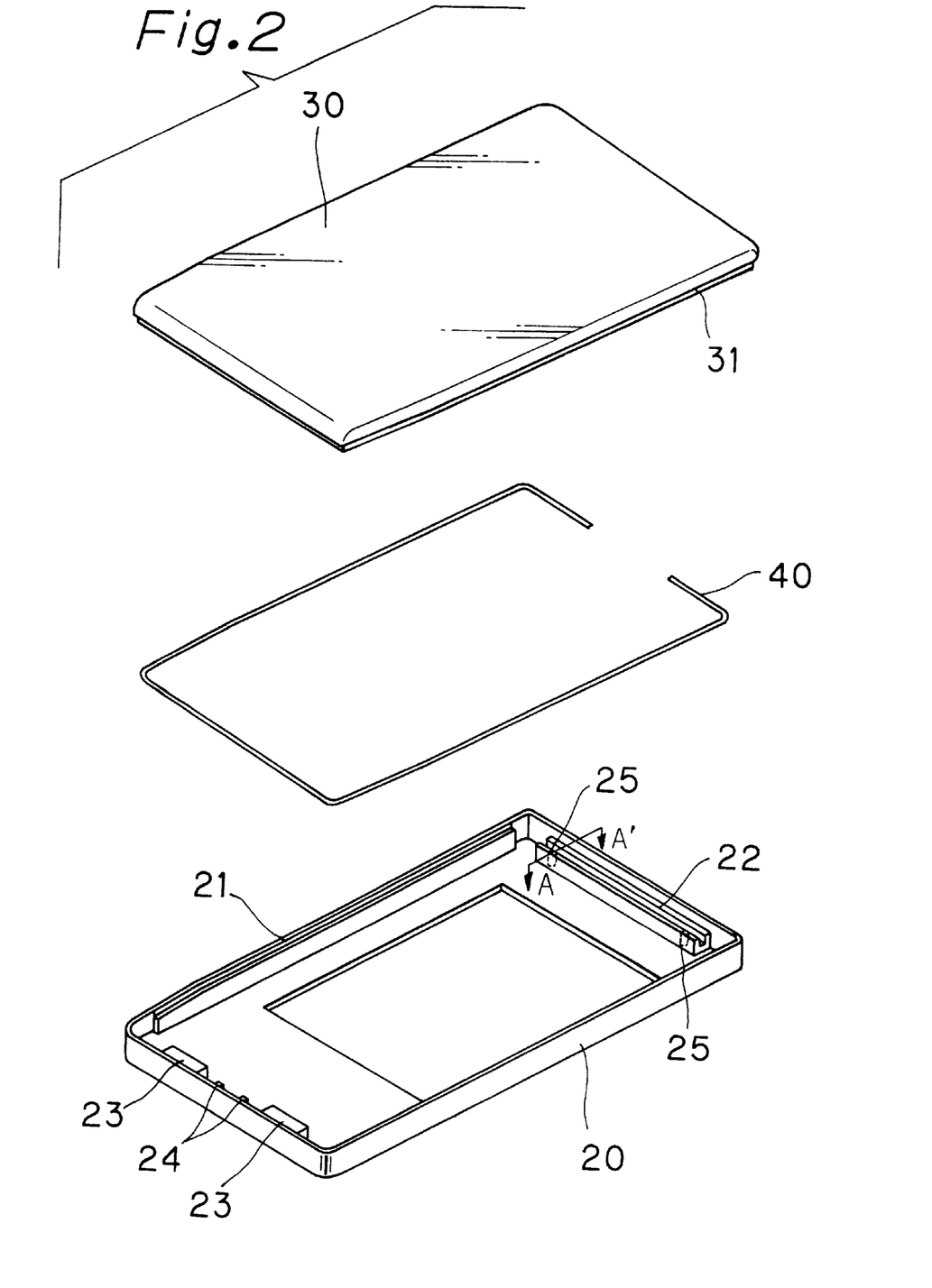
FIG. 2 is an explanatory view showing the construction which puts in practice the invention according to a first embodiment of the invention, when thermally depositing the case main body and the cover in the battery case according to the first embodiment of the invention.

FIG. 2 is an assembly oblique view of battery case 10. The case main body 20 and the cover 30 are the plastic molded products molded with thermoplastic resin, and Numeral 40 is a resistance heating element for heating based on the electric resistance. The fitting lower brim 31 is formed at the lower brim of cover 30.

A fitting concave section-A 21 is positioned on both the sides in longitudinal direction on the side of case main body 20 and the groove of a fitting concave section-B 22 and the like is positioned on another side, and moreover, a retainer jaw 23 and a receptacle rib 24 are formed for temporarily fixing the resistance heating element 40 on the opposing side.

The small diameter hole 25 drilled toward the bottom face of case main body 20 is installed at 2 places on the fitting concave section-B 22.

Figure 3:
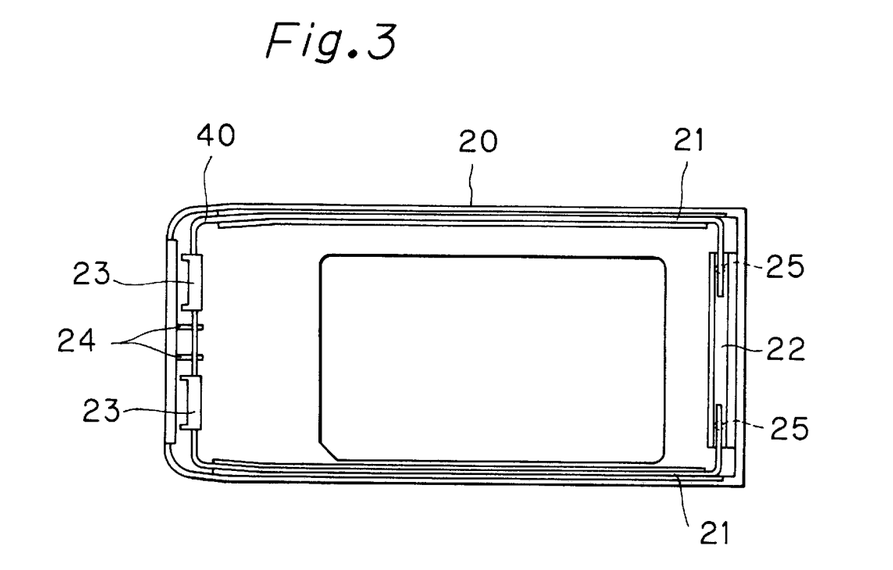
FIG. 3 is a plan view of case main body seeing from the cover side the state where the resistance heating element is incorporated into the case main body according to the first embodiment of the invention.

FIG. 3 is a plane view, viewed from the side of cover 30 in the state where the resistance heating element 40 is fitted to the case main body 20. The resistance heating element 40 is in the state of being fitted to each groove of fitting concave section-A 21 and fitting concave section-B 22 and being caught for its fixation between the retainer jaw 23 and the receptacle rib 24.

Figure 4:
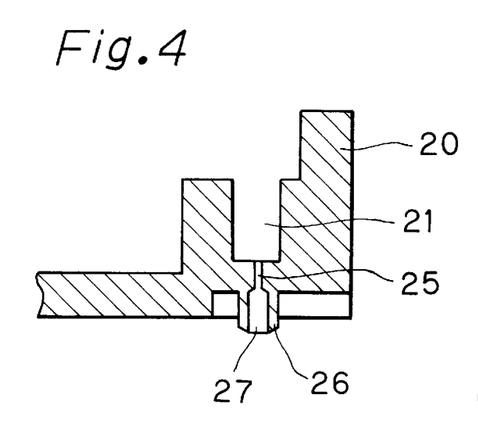
FIG. 4 is a cross sectional view taken along line of IV—IV of the small diameter hole of FIG. 2.

FIG. 4 shows the location for impressing the voltage to the resistance heating element 40 and is a cross sectional view taken along the line IV—IV of the small diameter hole in FIG. 2.

The small diameter hole 25 is provided toward the bottom face of case main body 20 on the bottom face of fitting concave section-A 21, and moreover, the protrusion stage section 26 integrally formed around this small diameter hole 25 is positioned on the bottom face of case main body 20, which becomes the terminal guide hole 27. For information, if the inside diameter of terminal guide hole 27 should be larger than the inside diameter hole of small diameter hole, it is easier to insert the voltage impressing terminal which is described later.

There is no need for installing the protrusion stage section 26 when the small diameter hole 25 does not need to be blocked. Moreover, the small diameter hole 25 may be formed when molding the case main body 20 or may be provided later when the hole alone exists.

The thermal deposition method in accordance with this invention is to be explained with reference to FIG. 5, FIG. 6, FIG. 7 and FIG. 8 which are cross sectional views taken along the line IV—IV in FIG. 2.

Figure 5:
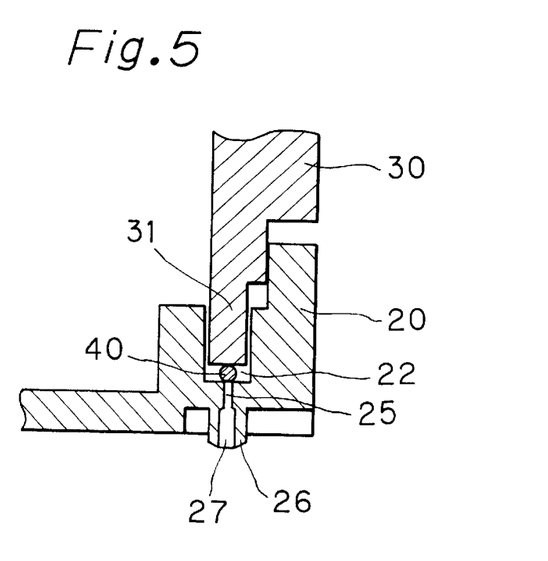
FIG. 5 is a cross sectional view of a small diameter hole section assembling a resistance heating body into the fitting concave section and catching a resistance heating element by the case main body and the cover according to the first embodiment of the invention.

The resistance heating element 40 is first inserted between the retainer jaw 23 and the receptacle rib 24 formed on the case main body 20 so that the body may be caught between them, and then assembled into the grooves of fitting concave section-A 21 and fitting concave section-B 22. The resistance heating element 40 is caught between the case main body 20 and the cover 30 by placing a cover 30 thereon and inserting its lower brim (deposition face) 31 into each of fitting concave sections 21 and 22.

And, the case main body 20 and the cover 30 is pressed toward their coupling direction with an adequate force using a pressing device (not shown in the figure). FIG. 5 shows the resulting state.

Figure 6:
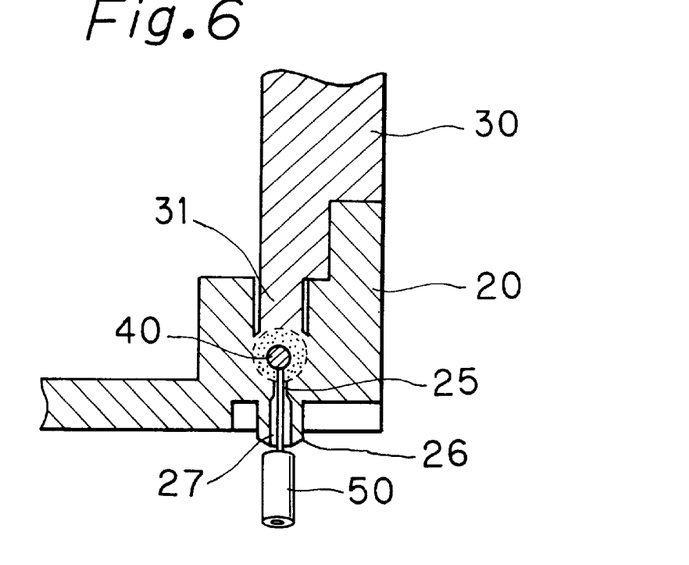
FIG. 6 is a cross sectional view of a small diameter hole section for a voltage applied terminal to be contacted with a resistance heating element to fuse the resin according to the first embodiment of the invention.

Next, as shown in FIG. 6, two voltage impressing terminals 50 connected to the voltage supply controller (not shown in the figure) are inserted into the terminal holes 27 respectively, further passed through the small diameter hole 25, to touch with the resistance heating element 40, then voltage is applied for heating the resistance heating element 40. Because of the presence of such factors as the size of used resin and the case and the material and the shape of resistance heating element 40, the heating conditions are previously set by the voltage supply controller.

The periphery resin gets fused by the heating of resistance heating element 40. Namely, the deposited resins on the side of case main body 20 and on the side of cover 30 get fused. This fusion area is the portion enclosed by the outside dot line in FIG. 6. The voltage impression (application) is stopped with the resin sufficiently fused and the voltage impressing terminal 50 is pulled out and cooled down. The fused resin then hardens, and the case main body 20 and the cover 30 get deposited, namely connected in contact for their coupling.

In this embodiment, the fitted concave sections, the object of the deposition, are 3 locations. However, the entire circumference of composition plane can be deposited if the groove which is the fitted concave section is provided to the entire circumference of composition plane and the ends of resistance heating element 40 overlap to each other or a ring shaped resistance heating element 40 is used.

Figure 7:
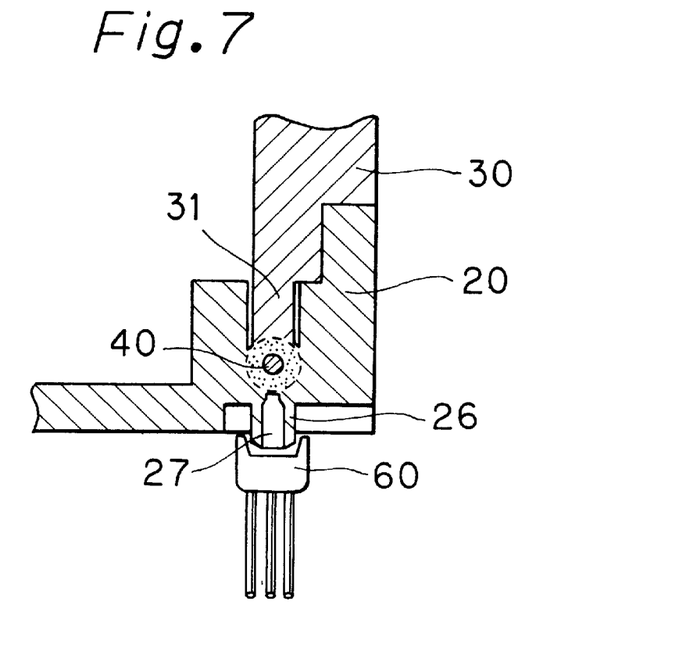
FIG. 7 is a cross sectional view of a small diameter hole section applying a deposition tip contacted with the stage section to fuse the stage section according to the first embodiment of the invention.
Figure 8:
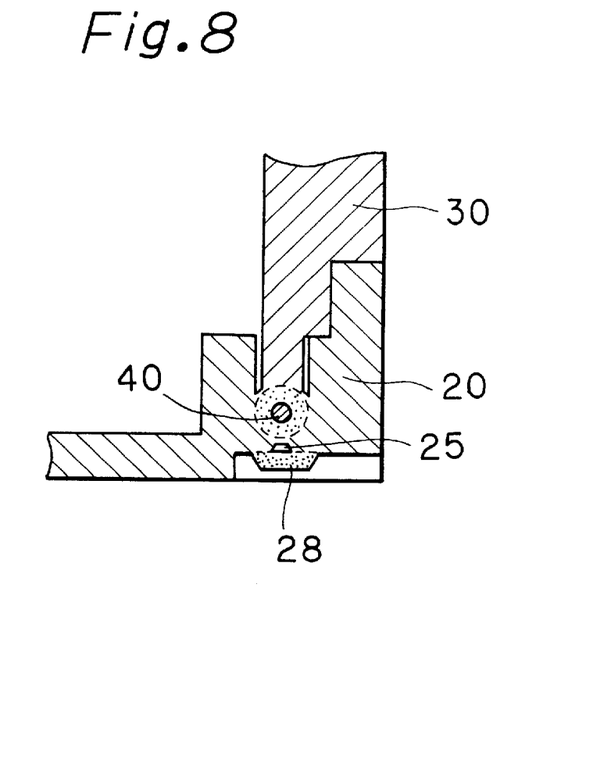
FIG. 8 is a cross sectional view of a small diameter hole section showing the status of having formed an expanded portion and blocked the small diameter hole according to the first embodiment of the invention.
Figure 9:
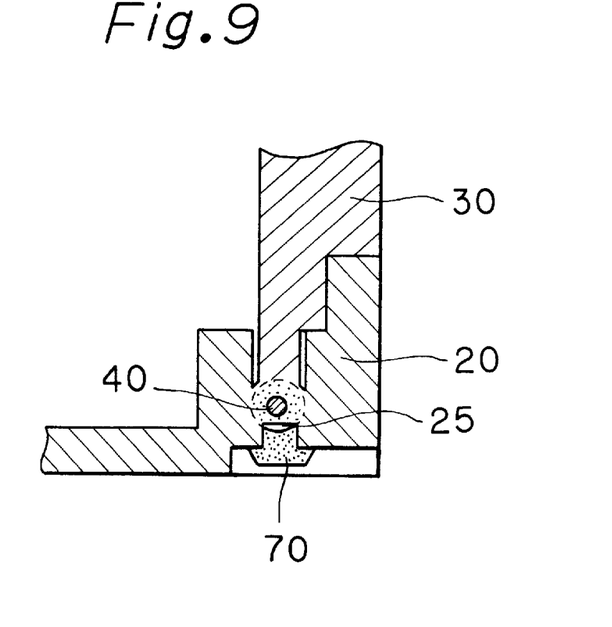
FIG. 9 is a cross sectional view of a small diameter hole section showing the status of having fitted a blocking body into the small diameter hole for its blocking according to the first embodiment of the invention.

Further, the following technique may be used for concealing the resistance heating element 40 from the outside of case 10. FIG. 7, FIG. 8 and FIG. 9 show the states during these further method steps.

The deposition tip 60 of a disk shaped contact face is touched to the tip of protrusion stage section 26 as shown in FIG. 7. Then, the resin of protrusion stage section 26 gets fused, and if it should further be pressed for its collapse against the fused tip 60, the resin of fused protrusion stage section 26 gets mixed into a united body.

Next, if the deposition tip 60 should be separated and cooled down, the swollen section 28 of disk section is formed as shown in FIG. 8, and as a result, the small diameter hole 26 is blocked and out of sight. The resistance heating element 40 disappears.

FIG. 9 is an embodiment where the blocking body 70 is fitted to the small diameter hole 25 as the blocking method of small diameter hole 25.

The deposition tip 80 may be a heating rod, but a nice finish can be obtained by using a deposition tip of the structure of blowing a refrigerant to a metallic strip for its coercive cooling-down after impressing a voltage to the metallic strip.

The contact face shape of deposition tip 60 can be made to be the shape meeting the purpose such as a cup shape, a square shape, etc.

Further, the groove and small diameter hole 25 for installing the resistance heating element 40 is installed on the side of case main body 20 in this embodiment. However, it may also be installed on the side of cover 30, and its position can be optionally selected as is convenient for the case shape and the manufacturing process.

Because the first embodiment of the invention relates to the thermal deposition method and the molded product for this deposition for assembling the resistance heating element into the molded product to be thermally deposited, inserting into the molded product the voltage impressing terminal from the small diameter hole provided to the molded product, and making it in contact with the resistance heating element for its heating and fusion, the effects as follows can be obtained:

1) Because the electrode for impressing the voltage doesn't protrude out of the molded product, there is no need for the secondary processing such as the cutting of electrode after its deposition.
2) By fusing the stage section and blocking the small diameter hole after providing the stage section protruding to the periphery of small diameter hole for impressing (applying) the voltage and depositing it, the heating element can not be seen from the outside, and the liquid won't invade, which protects the deposition area.
3) Because the small diameter hole is previously provided to the molded product, no other steps are required other than catching the resistance heating element between the deposition faces.
4) Reopening the case can simply involve inserting the electrode from the small diameter hole, applying the voltage to the resistance heating element, separating and releasing the case main body and the cover while re-fusing them, replacing, repairing, discriminating and discarding the parts contained therein.

A second embodiment of the invention, for forming the resistance heating element into a ring state so as not to leave any undeposited portions to the deposited face, is expounded on below with reference to FIG. 10 through FIG. 16.

Figure 10:
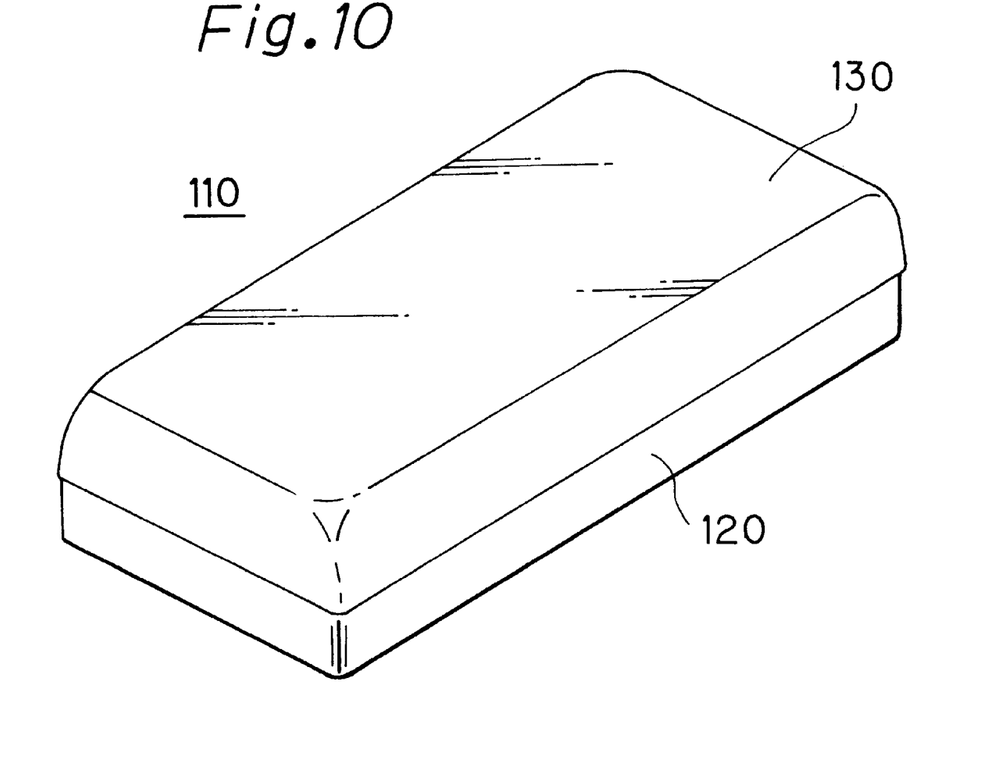
FIG. 10 is a completion oblique view of battery case using the technique according to a second embodiment of the invention.

FIG. 10 is a completion oblique view of a battery case 110 where the case main body and the cover are deposited using a ring shaped resistance heating element according to this invention. The battery case is of the shape where the cover 130 is placed on the case main body 120.

Figure 11:
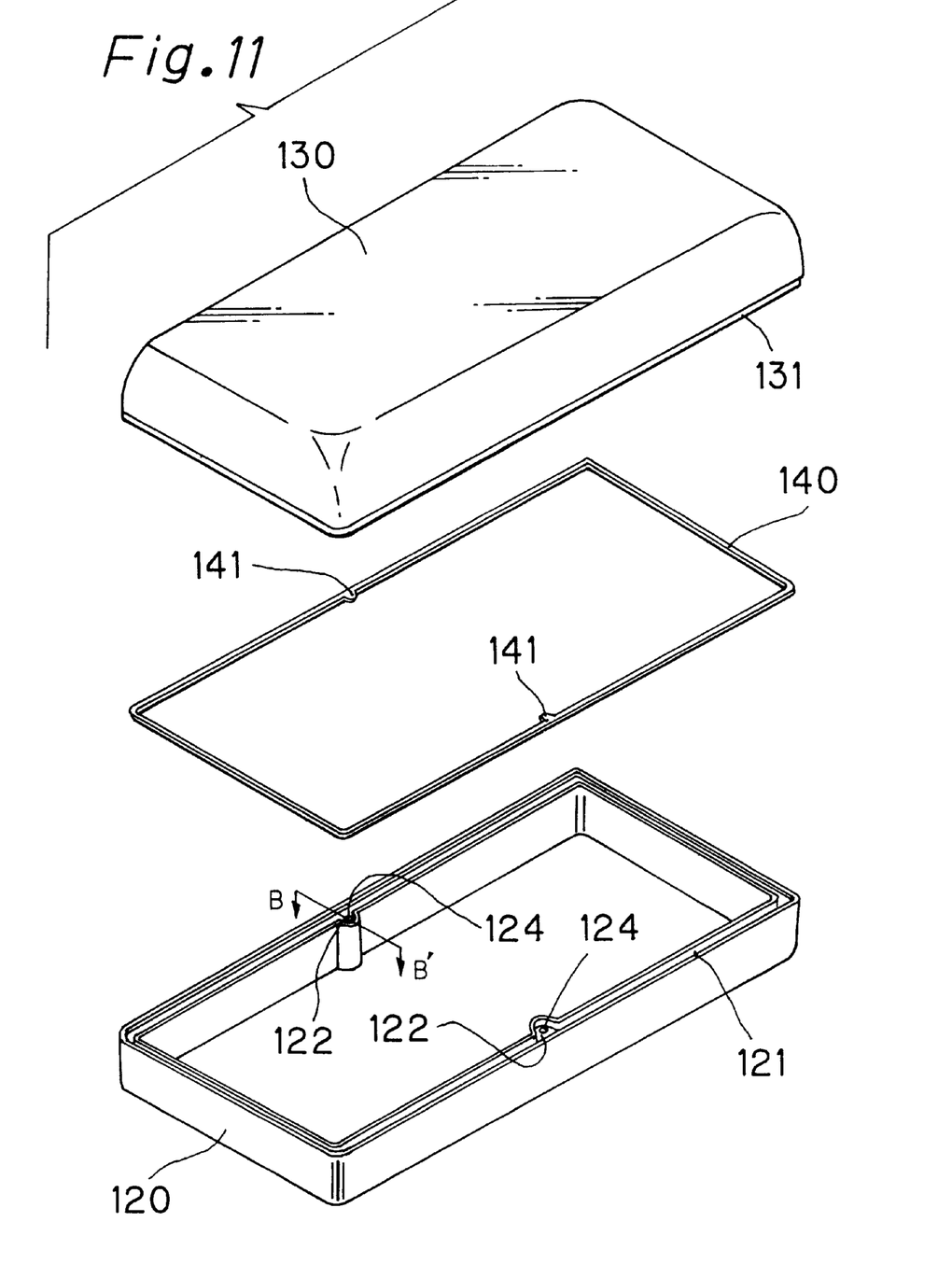
FIG. 11 is an explanatory view in the status using a ring state resistance heating element according to the second embodiment of the invention when thermally depositing the case main body with the cover in the battery case according to the second embodiment of the invention.

FIG. 11 is an assembly oblique view of battery case 110. The case main body 120 and the cover 130 are the plastic molded products molded with thermoplastic resin, and numeral 140 is the ring shaped resistance heating element which was formed with a nickel-chrome alloy. The fitting lower brim 131 is formed on the lower brim of cover 130.

The resistance heating element 140 has the same shape as the composition plane and moreover is of ring shape. The present embodiment uses the material of SUS 303 whose wall thickness is 0.15 mm and whose plate width is 0.5 mm, and two circular electrodes 141 are installed at the opposing points equally dividing the resistance heating element 140 into two sections.

The fitting concave section 121 as well as the round portion 122 of approximately the same shape as two electrodes 141 are installed on the resistance heating element 140 at two places of fitting concave section 121 and are provided on the upper brim on the side of case main body 120.

Figure 12:
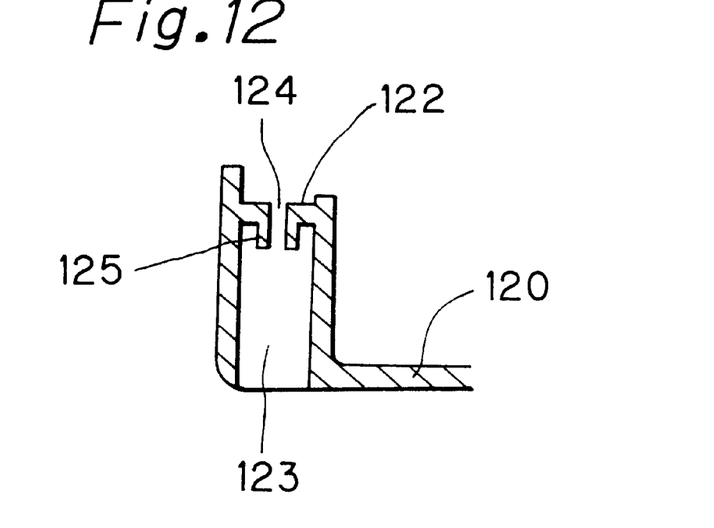
FIG. 12 is a cross sectional view taken along the line of XII—XII of round section.

FIG. 12 is a cross sectional view taken along the line B–B' of round portion 122. The terminal guide hole 123 opens toward the bottom face of case main body 120 on the rear side of the round portion 122, the small diameter hole 124 is drilled toward the bottom face of case main body 120 in the same way to the terminal guide hole 123 at the central area of round 122, and moreover, the integrally formed protrusion stage section 125 is installed at the periphery of small diameter hole 124 on the side of terminal guide hole 123. The small diameter hole 124 apart from the terminal guide hole 123 may be molded during the molding of case main body 120, or may be processed and molded at a later time.

The assembling method of resistance heating element is to be explained on the basis of FIG. 13, FIG. 14, FIG. 15 and FIG. 16 which are the enlarged views of cross section taken along the line B–B' of the round portion 122.

Figure 13:
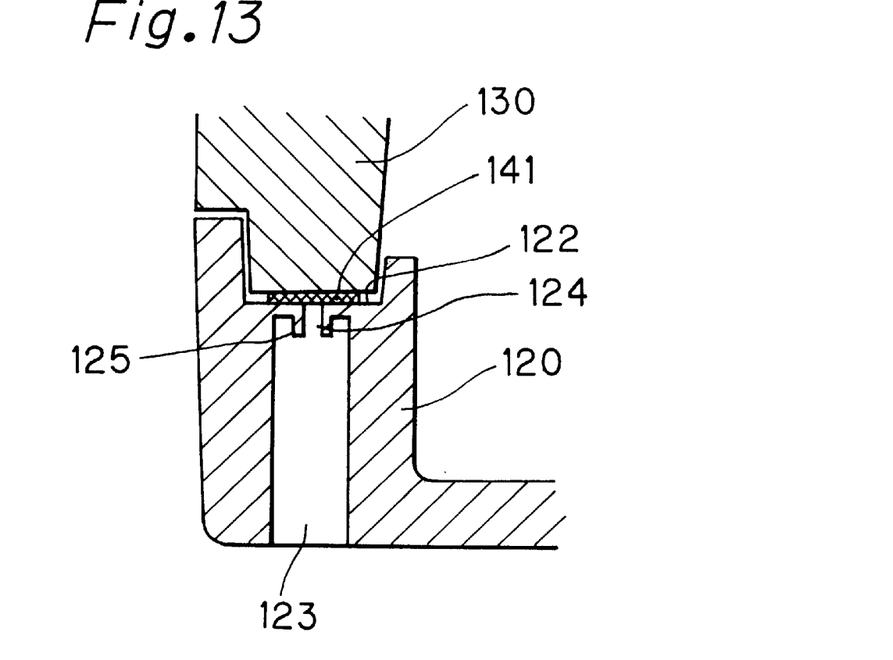
FIG. 13 is a cross sectional view of round section having incorporated a resistance heating body into the fitted concave section and having caught a resistance heating element by the case main body and the cover according to the second embodiment of the invention.

FIG. 13 is a view showing the preparation of for the deposition. The resistance heating element 140 is assembled into the fitting concave section 121 so that the electrode 141 of resistance heating element 140 may be settled to the round portion 122 formed on the fitting concave section 121. The cover 130 is placed on it, its lower brim (fusion face) is be matched to the fusion face on the side of the case main body 120, and further the resistance heating element 140 is caught between both the fusion faces. The case main body 120 and the cover 130 is be pressed toward their coupling direction with an adequate force using the presser (not shown in the figure).

Figure 14:
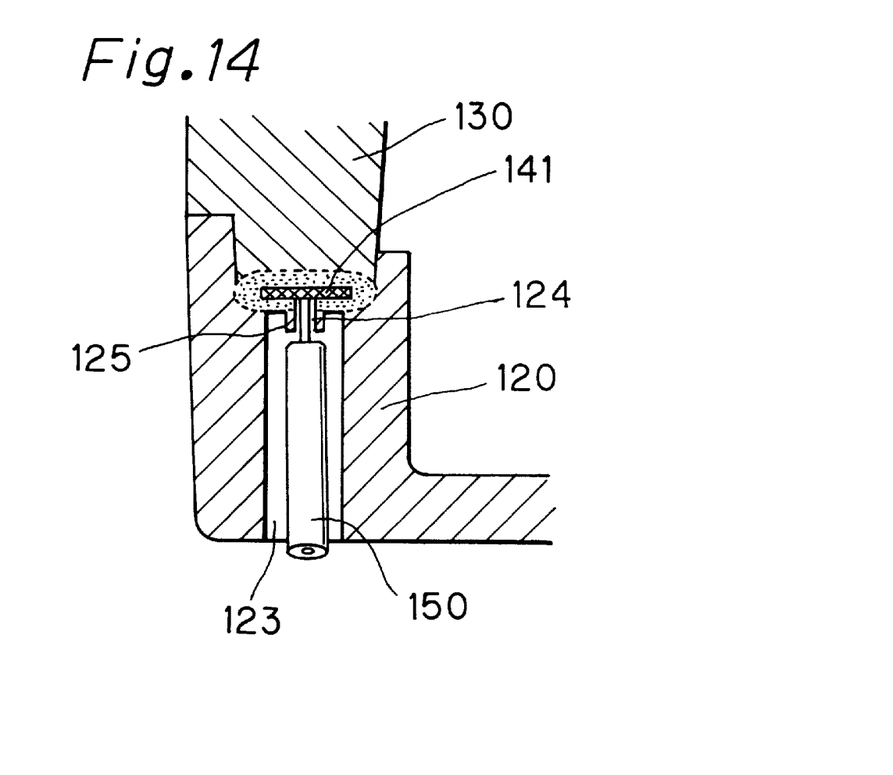
FIG. 14 is a cross sectional view of round section of making a voltage impressed terminal to be contacted with the electrode of resistance heating body for fusing the plastic according to the second embodiment of the invention.

Next, as shown in FIG. 14, two voltage impressing terminals 150 connected to the voltage supply controller (not shown in the figure) is inserted into the respective terminal guide holes 123, and further being made in contact with the electrode 141 of resistance heating element 140 through the small diameter hole 124, the voltage of AC 4V (100A) is impressed (applied) for 2.5 seconds for heating the resistance heating element 140. Because this heating condition varies with the size of resin used and the case, it is recommended to previously set the conditions into the voltage supply controller.

The resin in the surrounding region is fused by the heating of resistance heating element 140. Namely, the fused resins on the side of case main body 120 and on the side of cover 130 are fused to each other. This fusion zone is the area enclosed by the outside dot line in FIG. 14. And when the voltage is stopped in the sufficiently fused state and the voltage impressing terminal 150 is pulled out for cooling down, then the fused resin gets hardened and the case main body 120 and the cover 130 are deposited and coupled to each other.

Figure 15:
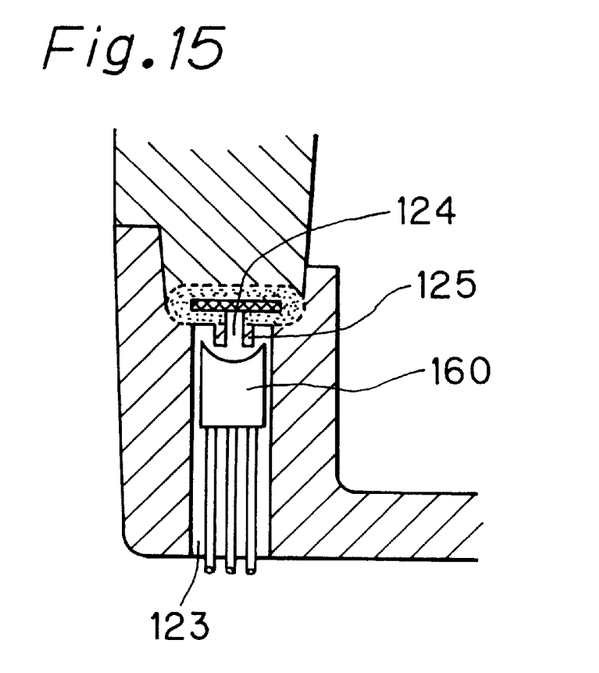
FIG. 15 is a cross sectional view of a round section, having applied the deposition tip to the stage section for fusing the stage section according to the second embodiment of the invention.
Figure 16:
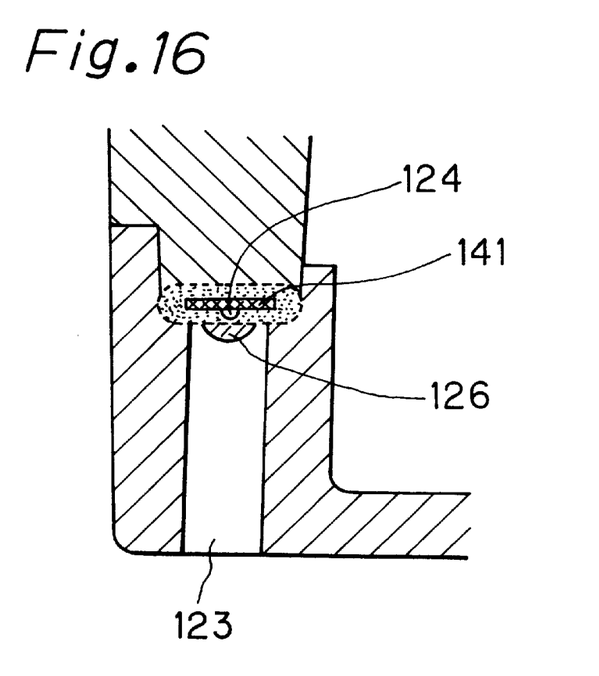
FIG. 16 is a cross sectional view of a round section showing the status of having formed a swollen section and blockading the small diameter hole according to the second embodiment of the invention.

The following technique may be added if you want to conceal the resistance heating element 140 from the outside of case 110 or to hermetically seal the case 110. FIG. 15 and FIG. 16 are views showing that status.

First, as shown in FIG. 15, the deposition tip 160 whose contact face is of cup shape is be inserted into the terminal guide hole 123, and made in contact with the protrusion stage section 125 which is protrusively installed to the periphery of small diameter hole 124. Then, the resin of protrusion stage section 125 gets fused, and if it should be further pressed for its collapse by the deposition tip, the resin of fused protrusion stage section 125 gets mixed and united. Next, when the deposition tip 160 is separated and cooled down, the swollen section 126 is formed as shown in FIG. 16, and the small diameter hole 124 is blockaded, the electrode 141 (resistance heating element 140) disappears, and moreover, the case 110 is hermetically sealed.

The deposition tip 160 may be a heating rod, but a nice finish can be obtained if the deposition tip of such construction should be used as blowing a refrigerant to a metallic strip and coercively cooling it down after applying the voltage to a metallic strip for its deposition.

Further, in this embodiment, the small diameter hole 124 is provided on the side of case main body 120 and the voltage impressing terminal 150 is pressed against the electrode 141 of resistance heating element 140 from the rear side of case main body 120, but it is also acceptable to provide the small diameter hole 124 to the side of cover 130, and the position of small diameter hole 124 can be optionally selected in view of the convenience of the shape of case and the manufacturing process.

Moreover, the electrode 141 has been installed to the resistance heating element but there is no need for installing the electrode in case of the construction where the voltage impressing terminal can be made in secure contact with the resistance heating element.

A third embodiment relates to the method for making the voltage impressing terminal contacted from its lateral face contacted to the resistance heating element caught between the case main body and the cover.

Figure 17:
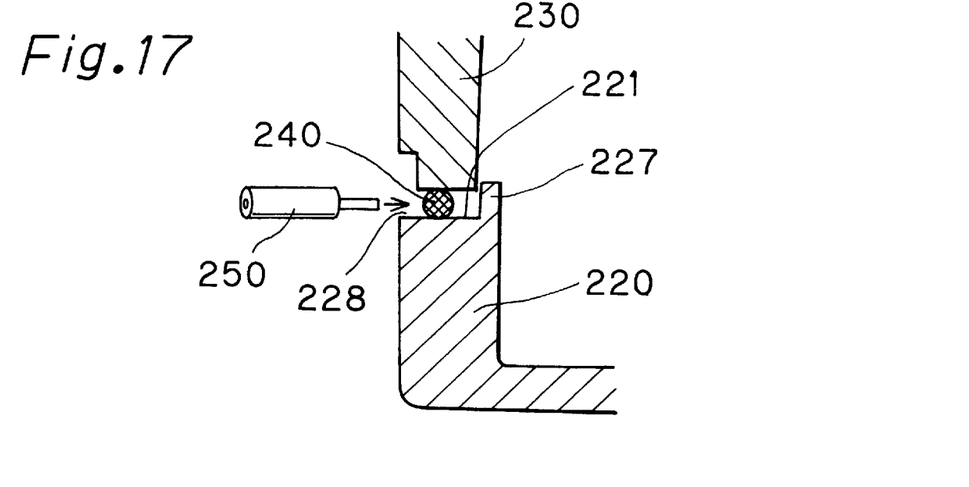
FIG. 17 is an explanatory view of embodiment for inserting a voltage impressing terminal from a split state concave section formed on the lateral face of the case main body and cover for applying a voltage to the resistance heating element according to a third embodiment of the invention.
Figure 18:
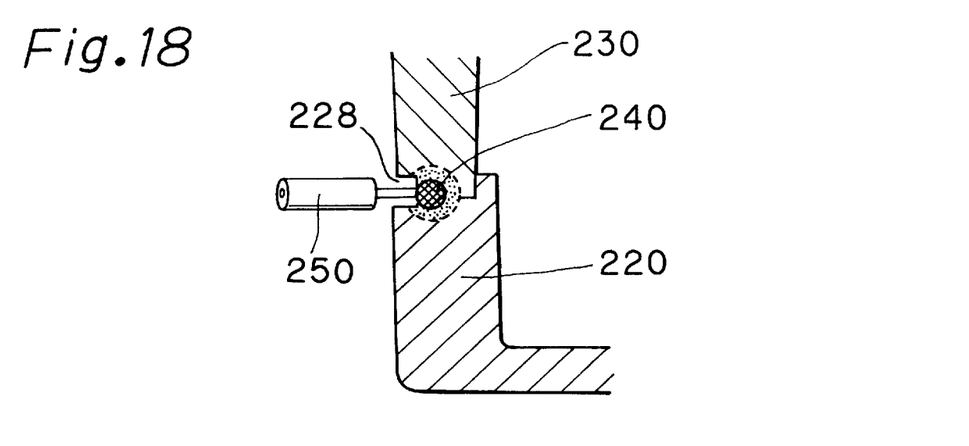
FIG. 18 is an explanatory view showing the status of having impressed a voltage from the lateral face for heating and fusing the resistance heating element according to the third embodiment of the invention.
Figure 19:
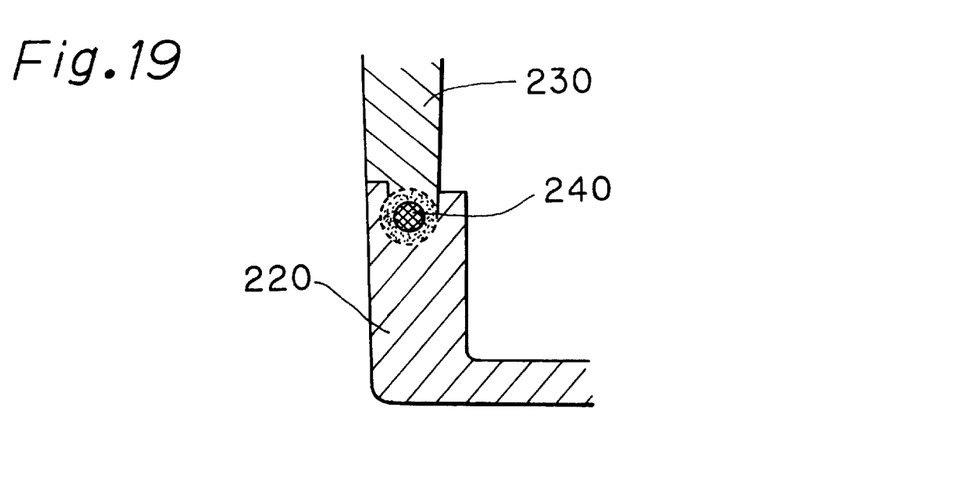
FIG. 19 is an explanatory view of showing the deposition status in the sections other than the voltage applied point according to the third embodiment of the invention.
Figure 20:
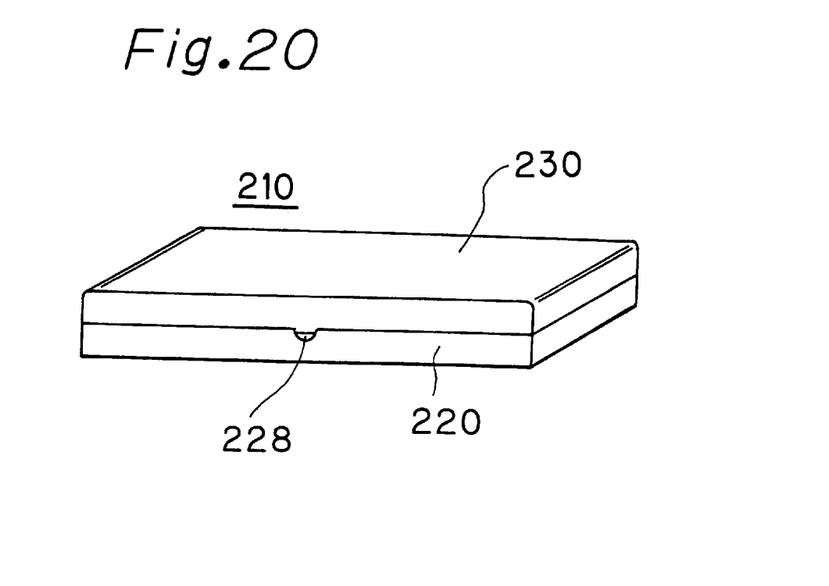
FIG. 20 is an oblique view of a case which has been completed by the method according to the third embodiment of the invention.

FIG. 17 through FIG. 19 are cross sectional views of that major portion, while FIG. 20 is a completion oblique view of case 210.

The half split state concave section 228 is formed toward the outside of case main body 220 from the face of rib 227 at two points applicable to the opposite point positions of resistance heating element 240 approximately dividing the ring shaped resistance heating element 240 into two divisions in the deposition face on the side of case main body 220.

As the deposition method, the resistance heating element 240 is settled to the fitting concave section 221 formed on the case main body 220 as shown in FIG. 17, the cover 230 is be placed on it, and its lower brim is be mated to the deposition face on the side of case main body 220, and further the resistance heating element 240 is be caught between both the deposition faces. Moreover, the same procedures as those of the first and second embodiments is followed until the case main body 220 and the cover 230 are pressed to their coupling direction with an adequate force using the presser (not shown in the figure).

At that time, the resistance heating element 240 caught inside the case 210 is exposed at 2 places of half split state concave section 228 installed to the case main body 220. Therefore, the voltage impressing terminal 250 can be pressed against the section of exposed resistance heating element 240, and if the voltage should be applied to the resistance heating element 240 by the voltage impressing terminal 250 as shown in FIG. 18, the resistance heating element 240 is heated, there appears the fusion zone enclosed by the dot line, and if it should be further cooled down, the case main body 220 and the cover 230 are deposited.

FIG. 19 is a cross sectional view showing the fusion zone in the places other than the half split stage concave section 228, and FIG. 20 is a completion oblique view of case 210 and shows the position of half split state concave section 228.

The tensile strength of supersonic wave deposition method being used frequently to the deposition of conventional thermoplastic resin was compared with the deposition method using the thin plate ring shaped resistance heating element of the second embodiment of the invention for their measurements.

Table 1 indicates its result.

Figure 211:
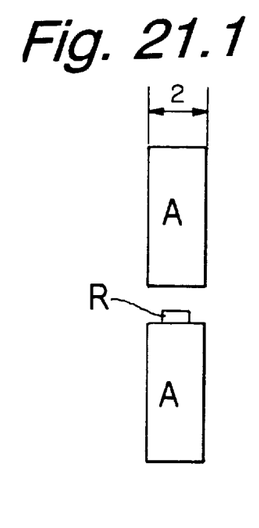
Figure 212:
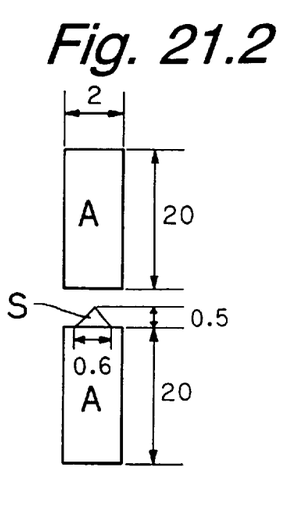
Figure 213:
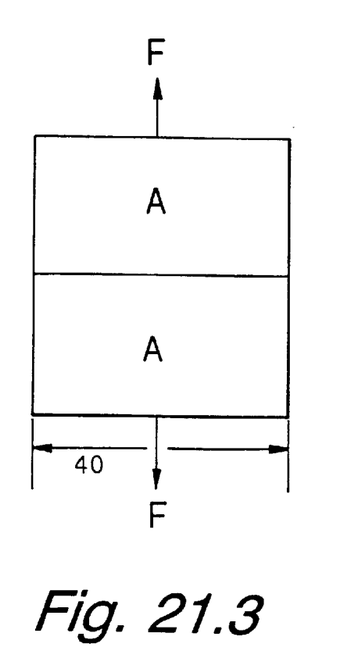

The molded piece shown in FIGS. 21.1, 21.2 and 21.3 molded with the ABS resin was used as the test piece.

The method of FIG. 21.2 using the resistance heating element R caught the resistance heating element R using the material SUS 304 to the composition plane on one side in the test piece "A", and the voltage of AC 4V (6A) was applied to the said heating element for its thermal deposition.

The method of FIG. 21.2 using the supersonic wave deposition integrally molded the deposition rib S whose cross section is a triangle to the composition plane on one side and both the faces were contacted with each other for their deposition in the test piece "A". The unit of numerical figure showing the size in FIG. 21 is mm.

The tensile direction when taking a measurement of tensile strength is shown in FIG. 21.3.

The measured results proved to be the approximately same tensile strength in both the cases.

Therefore, it can be recognized that this invention where the deposition can be made instantaneously and moreover safely using the resistance heating element is superior to the supersonic wave deposition method which involves a danger for inducing a defective cause to the incorporated electronic parts and the like. ○ Tensile strength tester : Manufactured by Toyo Precision Device Pabrication Co., Ltd., Universal tensile tester Model vio-c.

○ Material of test piece (A): ABS resin

| Diposition method | Sample No. | Tensile strength of unit area. |
| --- | --- | --- |
| Resistance beating element: | 1. | 22.05 N/MM2 |
| | 2. | 22.44 |
| | 3. | 23.32 |
| Supersonic wave | 4. | 19.99 |
| | 5. | 20.29 |
| | 6. | 20.97 |

According to the second and third embodiments according to the invention, the effects as follows are available because they are the thermal deposition methods for assembling the ring shaped resistance heating element into the molded product to be thermally deposited, inserting the voltage impressing terminal into the molded product from the small diameter hole provided to the molded product to have it contacted to the resistance heating body for Its thermal deposition.

1) Because the electrode for impressing the voltage doesn't protrude to the outside of molded product, there is no need for the secondary processing of cutting and so forth of electrode after the deposition.
2) Because the resistance heating element is of ring shape, the entire composition plane can be deposited, and the enhancement of junction strength and the enhancement of sealing property can be attempted.
3) A hermetically sealed plastic case can be manufactured by installing the stage section protruding to the periphery of small diameter hole for impressing the voltage, and fusing this stage section after its deposition to blockade the small diameter hole.
4) The resistance heating element of same code can be produced efficiently by pressing the resistance heating thin plate to form the ring shaped resistance heating element.

5) If an optional concave section (resin bank) on the surface of resistance heating element, the junction strength of composition plane between the case main body and the cover can be enhanced.

While specific embodiments of the invention have been shown and described in detail to illustrate the application of the principles of the invention, it will be understood that the invention may be embodied otherwise without departing from such principles.

What is claimed is:

1. A method for thermally depositing molded product parts on each other along composition surfaces, the method comprising the steps of:

positioning a resistance heating element between at least some of the composition surfaces of the molded product parts, the parts being formed of thermoplastic resin;

applying pressure to the parts with an adequate force to urge the composition surfaces together and to catch the resistance heating element therebetween;

providing a small diameter hole in one of the parts for inserting a voltage impressing terminal, so that the voltage impressing terminal may reach the resistance heating element, and inserting the voltage impressing terminal into said small diameter hole to have the terminal contact the resistance heating element; and applying voltage to the resistance heating element by the inserted voltage impressing terminal to heat the resistance heating element and the composition surfaces and to fuse the composition surfaces to each other and around the resistance heating element thereby depositing the composition surfaces to each other.

2. The deposition method according to claim 1, further comprising:

providing a protrusion stage section at a periphery of the small diameter hole;

blocking the small diameter hole by heating, pressing and collapsing said protrusion stage section using a deposition tip.

3. The deposition method according to claim 1, further comprising: fitting a blocking body to the small diameter hole for blocking the hole after said applying of voltage.

4. A method of forming a product from molded product parts, comprising:

positioning a resistance heating element between at least two surfaces of the molded product parts, the parts being formed of thermoplastic resin;

coupling the at least two surfaces by applying pressure to the parts with an adequate force to urge the at least two surfaces together and to catch the resistance heating element therebetween;

providing a small diameter hole in one of the parts prior to said step of coupling;

inserting a voltage impressing terminal through said hole to said resistance heating element;

impressing voltage to said resistance heating element by the inserted voltage impressing terminal to heat the resistance heating element and the at least two surfaces; and fusing the at least two surfaces to each other and around the resistance heating element and thereafter cooling the at least two surfaces down for deposition of the at least two surfaces to each other.

5. A thermal deposition method, comprising:

providing molded parts of thermoplastic resin;

forming a resistance heating element into a ring shapes;

positioning the resistance heating element between at least two surfaces of the molded parts;

drilling small diameter holes into the molded parts for inserting at least one voltage impressing terminal at two points separated by approximately ½ the length of the resistance heating element; and inserting the voltage impressing terminal from the outside of the molded parts into said small holes and applying voltage to the resistance heating element by the inserted voltage impressing terminal to fuse the at least two surfaces to each other and around the resistance heating element thereby depositing the at least two surfaces to each other.

6. The method according to claim 5 wherein a plurality of voltage impressing terminals are installed to apply voltage to the resistance heating element.

7. The method of claim 5, further comprising:

forming said resistance heating element by punching a thin plate into the ring shape.

8. The method of claim 5, further comprising the steps of:

thermally depositing a case main body and a cover as the parts.

* * * * *